United States Patent
Tanaka (10) Patent No.: US 10,868,886 B2
(45) Date of Patent: Dec. 15, 2020

(54) COMMUNICATION DEVICE SCHEDULING COMMUNICATION PROCESSING, COMMUNICATION METHOD, AND COMPUTER PROGRAM PRODUCT

(71) Applicant: Kabushiki Kaisha Toshiba, Minato-ku (JP)

(72) Inventor: Yasuyuki Tanaka, Chigasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 57 days.

(21) Appl. No.: 15/904,607

(22) Filed: Feb. 26, 2018

(65) Prior Publication Data

US 2019/0082028 A1 Mar. 14, 2019

(30) Foreign Application Priority Data

Sep. 11, 2017 (JP) ................. 2017-174343

(51) Int. Cl.
| | | |
|---|---|---|
| *H04L 29/08* | (2006.01) | |
| *H04L 5/14* | (2006.01) | |
| *H04W 84/04* | (2009.01) | |
| *H04L 5/00* | (2006.01) | |

(52) U.S. Cl.
CPC ............... *H04L 67/32* (2013.01); *H04L 5/14* (2013.01); *H04L 5/0091* (2013.01); *H04W 84/04* (2013.01)

(58) Field of Classification Search
CPC ......... H04L 67/32; H04L 5/14; H04L 5/0091; H04W 84/04
See application file for complete search history.

(56) References Cited

U.S. PATENT DOCUMENTS

| 2016/0020987 A1* | 1/2016 | Wetterwald ......... H04L 41/0803 370/252 |
| 2016/0262098 A1* | 9/2016 | Vijayasankar .... H04W 52/0209 |

FOREIGN PATENT DOCUMENTS

| JP | 2002-158628 | | 5/2002 |
| JP | 2002-325114 | A | 11/2002 |
| JP | 2010-088000 | A | 4/2010 |
| WO | WO 02/08919 | A1 | 1/2002 |
| WO | WO 2017/037403 | A1 | 3/2017 |

OTHER PUBLICATIONS

Fischmeister et al., A Verifiable Language for Programming Real-Time Communication Schedules, IEEE Transactions on Computers, vol. 56, No. 11, Nov. 2007 (Year: 2007).*

"IEEE Standard for Low—Rate Wireless Networks", IEEE Computer Society, IEEE Std 802.15.4-2015, pp. 57-150.

Q. Wang, et al., "6top Protocol (6P)", Oct. 2017, 45 Pages.

* cited by examiner

*Primary Examiner* — Justin T Van Roie
(74) *Attorney, Agent, or Firm* — Oblon, McClelland, Maier & Neustadt, L.L.P.

(57) ABSTRACT

According to an embodiment, a communication device includes an arrangement unit, a communication control unit, and a processing control unit. The arrangement unit is configure to arrange a schedule of a communication processing that transmits and receives a message with time division multiplex communication and one of more schedules of one or more pieces of application processing that are different from the communication processing. The communication control unit is configured to transmit and receive a message according to the arranged schedule. The processing control unit is configured to control execution of an application according to the arranged schedule.

8 Claims, 11 Drawing Sheets

| 0 | 1 | 2 | 3 | 4 |
|---|---|---|---|---|
| SHARED | | | | |

FIG.5

| 0 | 1 | 2 | 3 | 4 |
|---|---|---|---|---|
| SHARED | TRANSMITTED BY NODE 100b | | | |

| 0 | 1 | 2 | 3 | 4 |
|---|---|---|---|---|
| SHARED | APPLICATION PROCESSING | APPLICATION PROCESSING | | TRANSMITTED BY NODE 100b |

COMMUNICATION DEVICE SCHEDULING COMMUNICATION PROCESSING, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2017-174343, filed on Sep. 11, 2017; the entire contents of which are incorporated herein by reference.

FIELD

Embodiments described herein relate generally to a communication device, a communication method, and a computer program product.

BACKGROUND

The Institute of Electrical and Electronics Engineers (IEEE) 802.15.4-2015 standards define a transmission and reception method in Time-Slotted Channel Hopping (TSCH). In the TSCH, reliable communication is possible when an agreement on communication timing between communication nodes is made in advance. The communication timing of the TSCH between neighboring nodes can be dynamically agreed by using 6top Protocol that has been developed by Internet Engineering Task Force (IETF) 6TiSCH WG.

In the TSCH, a transmission node and a reception node transmit and receive data at a predetermined time with a predetermined frequency. In the TSCH, to maintain a clock synchronization state between nodes, control data is transmitted and received at a certain frequency even when the transmission node does not have data to be transmitted. Conventional techniques are described in IEEE 802.15.4-2015—IEEE Standard for Low-Rate Wireless Networks, and 6top Protocol (6P), for example.

DETAILED DESCRIPTION

According to an embodiment, a communication device includes an arrangement unit, a communication control unit, and a processing control unit. The arrangement unit is configure to arrange a schedule of a communication processing that transmits and receives a message with time division multiplex communication and one of more schedules of one or more pieces of application processing that are different from the communication processing. The communication control unit is configured to transmit and receive a message according to the arranged schedule. The processing control unit is configured to control execution of an application according to the arranged schedule.

Hereinafter, preferred embodiments will be described in detail with reference to the accompanying drawings.

First Embodiment

A communication device according to a first embodiment is capable of arranging a schedule of a communication processing that transmits and receives a message with time division multiplex communication and a schedule of an application processing. For example, a communication device (node) is set so that the communication device can also handle the timing of an application operation, in a protocol for agreeing and setting the communication timing of the TSCH. The node includes a function of handling the scheduling of the TSCH processing and the scheduling of the application processing in an integral manner, and adjusts the schedules so that the TSCH processing and the application processing will not occur at the same time.

Figure 1:
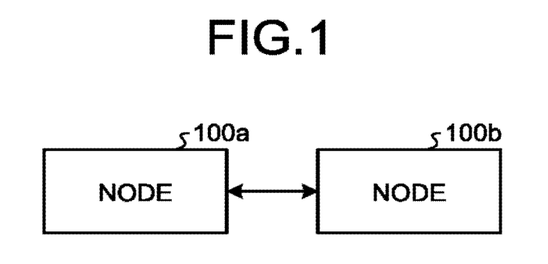
FIG. 1 is a block diagram of a communication system according to a first embodiment.

FIG. 1 is a block diagram illustrating a configuration example of a communication system according to the first embodiment. As illustrated in FIG. 1, the communication system includes nodes 100a and 100b as communication devices. Because the nodes 100a and 100b have the same configuration, the nodes 100a and 100b are simply referred to as a node 100, when the nodes 100a and 100b need not be distinguished from one another. The number of the node 100 is not limited to two, and may be three or more. A plurality of the nodes 100 are connected via a wireless network such as IEEE 802.15.4. Any other communication form may be used to connect the nodes 100, and for example, the nodes 100 may be connected via a wired network.

Data is transmitted and received between the node 100a and the node 100b. Hereinafter, for convenience sake, it is assumed that the node 100a is a data transmission node, and the node 100b is a data reception node.

The node 100a and the node 100b are time synchronized with each other, and transmit and receive data at a predetermined timing. Typically, the node 100a and the node 100b control communication using the TSCH. However, it is also possible to use a time division multiplex communication system other than the TSCH.

Figure 2:
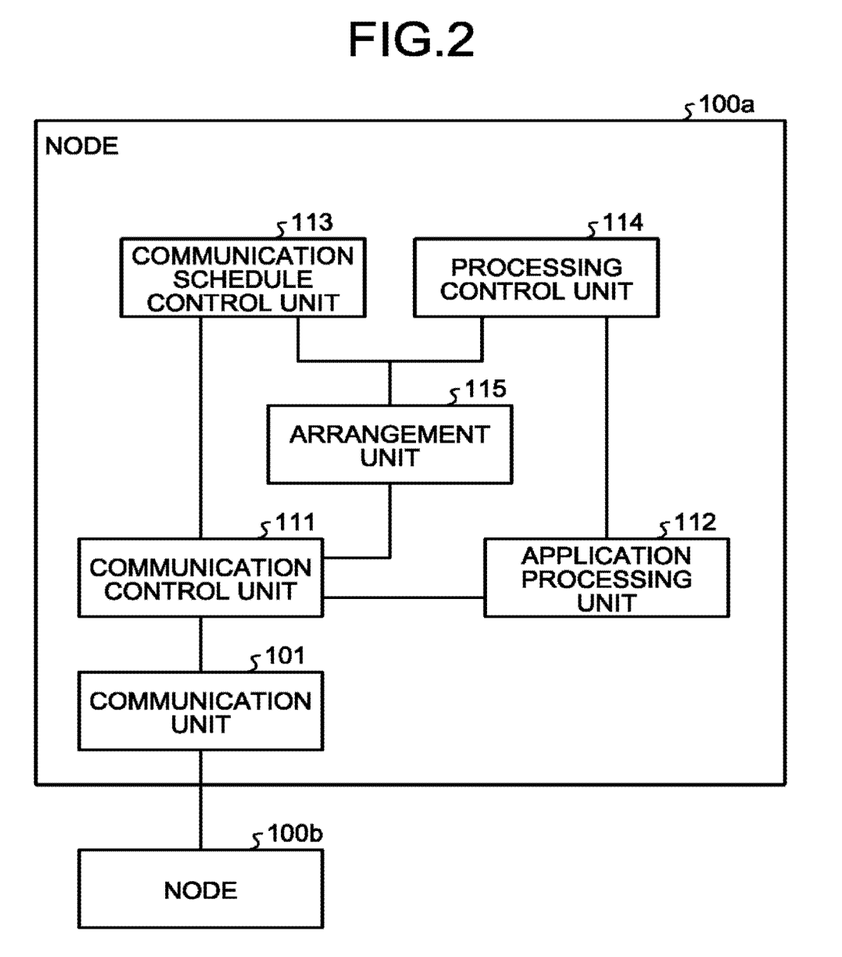
FIG. 2 is a block diagram of a node according to the first embodiment.

FIG. 2 is a block diagram illustrating a configuration example of the node 100 according to the first embodiment. As illustrated in FIG. 2, the node 100 includes a communication unit 101, a communication control unit 111, an application processing unit 112, a communication schedule control unit 113, a processing control unit 114, and an arrangement unit 115.

The communication unit 101 is an interface for performing communication with an external device such as the other node 100 (node 100b in FIG. 2). The communication unit 101 performs communication using time division multiplexing such as TSCH, by being controlled by the communication control unit 111.

The communication control unit 111 controls a communication processing using the time division multiplexing. The arrangement unit 115 determines at which timing (a time slot, which will be described below, and the like) the communication shall take place in time division multiplexing. The communication control unit 111 controls the communication using the communication unit 101 and the like so that a message can be transmitted and received according to the schedule arranged by the arrangement unit 115. In a communication method using frequency hopping such as TSCH, the communication control unit 111 performs communication using the communication unit 101 and the like, by controlling a wireless channel to be used for communication in addition to the communication timing.

The application processing unit 112 executes an application processing different from the communication processing controlled by the communication control unit 111. The application processing may be any processing. For example, the application processing includes network processing higher than the TSCH, sensing processing using a sensor, actuation processing of a driving unit, log recording processing, and the like. The application processing may be processing involving communication, or processing not involving communication. The application processing is not limited to one, and two or more pieces of application processing may be executed.

The communication schedule control unit 113 controls the schedule of communication with time division multiplexing. For example, when there is data to be transmitted or received, the communication schedule control unit 113 controls the number of time slots for transmitting and receiving data that is required between the node 100 and the other node 100. The communication schedule control unit 113 also controls the timing of transmission and reception (which time slot to be used). When the TSCH is used, the communication schedule control unit 113 may control the necessary communication bandwidth. The determined schedule is passed to the arrangement unit 115, and the arrangement unit 115 arranges the final schedule of the processing.

The processing control unit 114 controls the execution of the application processing. For example, the processing control unit 114 determines the timing (schedule) of executing the application processing, the processing time limit, an assumed processing time, and the like. When there are a plurality of pieces of application processing, the processing control unit 114 may arrange the schedule of each piece of the application processing. The determined schedule is passed to the arrangement unit 115, and the arrangement unit 115 arranges the final schedule of the processing. Thus, the processing control unit 114 controls the execution of an application according to the schedule arranged by the arrangement unit 115.

The arrangement unit 115 arranges the schedule of communication processing with time division multiplexing and the schedule of an application processing. For example, the arrangement unit 115 arranges the schedule so that the communication schedule control unit 113 and the processing control unit 114 can operate in a cooperative manner, the requirements of the communication processing and the requirements of the application processing can be satisfied, and the conflict between the schedules can be resolved as much as possible.

When the schedule needs to be arranged with the other node 100, the arrangement unit 115 determines what kind of requests and suggestions are to be made, and what kind of requests and suggestions are to be accepted, relative to the other node 100. The arrangement unit 115 performs scheduling by exchanging a message with the other node 100.

For example, the units described above (communication control unit 111, application processing unit 112, communication schedule control unit 113, processing control unit 114, and arrangement unit 115) are to be implemented by one or a plurality of processors. For example, the units described above may be implemented by causing a processor such as a central processing unit (CPU) to execute a computer program, in other words, software. The units described above may also be implemented using a processor such as a dedicated integrated circuit (IC), in other words, hardware. The units described above may also be implemented by a combination of software and hardware. When the processors are used, each of the processors may implement one of the units or two or more of the units.

Figure 3:
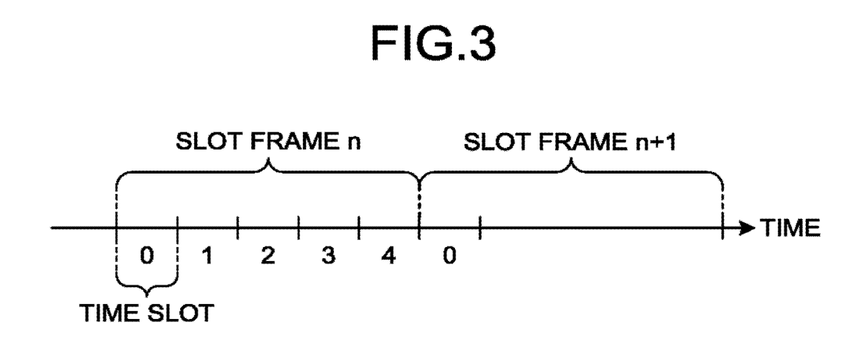
FIG. 3 is a diagram illustrating an example of time divided into units using time division multiplexing.

Next, communication using time division multiplexing will be described. FIG. 3 is a diagram illustrating an example of time divided into units using time division multiplexing. As illustrated in FIG. 3, in time division multiplexing, time is divided into certain periods. The minimum unit of the divided period is referred to as a time slot, and one or more of the time slots are referred to as a slot frame. In the example illustrated in FIG. 3, five time slots are included in a single slot frame.

Each of the time slots is managed so that the time slot can be uniquely specified in the slot frame. Each of the time slots appears periodically with a lapse of time. In FIG. 3, the time slots are identified by indexes from zero to four. The time slot having the same index appears in each slot frame. Moreover, each of the slot frames is managed so that the slot frame can be uniquely specified in a sufficiently long time period. In the example of FIG. 3, an index such as "n" or "n+1" is applied to the slot frame. The time slot may also be managed by applying an absolute identifier to each of the time slots. In this case, each of the slot frames may be considered as a slot frame with infinitely long period including infinitely long time slots.

Figure 4:
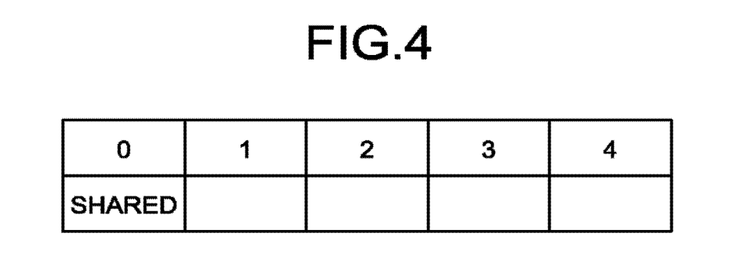
FIG. 4 is a diagram illustrating an example of a schedule at an initial state.

To make the node 100a and the node 100b communicate with each other, matters such as which node 100 is to transmit data and which node 100 is to receive data in which time slot, or whether both nodes 100 can transmit and receive data in which time slot ("shared", which will be described below) need to be defined. Deciding processing to be performed in a certain time slot, for the time slot, is referred to as scheduling, and the result of scheduling is referred to as a schedule. FIG. 4 is a diagram illustrating an example of a schedule at an initial state.

In the schedule of FIG. 4, the time slot at the head of each of the slot frames (time slot 0) is defined as "shared". In the "shared" time slot, the node 100a may transmit data or the node 100b may transmit data. In other words, when the node 100a and the 100b each have data to be transmitted to the other, the node 100a and the node 100b can transmit the data using the head time slot in each of the slot frames. When the node 100a and the node 100b do not have data to be transmitted, the nodes 100 wait for data reception in the head time slot in each of the slot frames, and prepare for data transmission.

Figure 5:
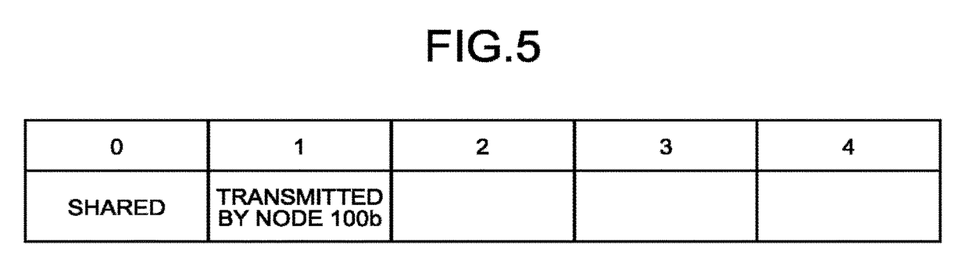
FIG. 5 is a diagram illustrating an example of a schedule.

A situation where new scheduling is performed and the node 100b is given an opportunity to transmit data will be described. FIG. 5 is a diagram illustrating an example of a schedule to be set in this case.

Figure 6:
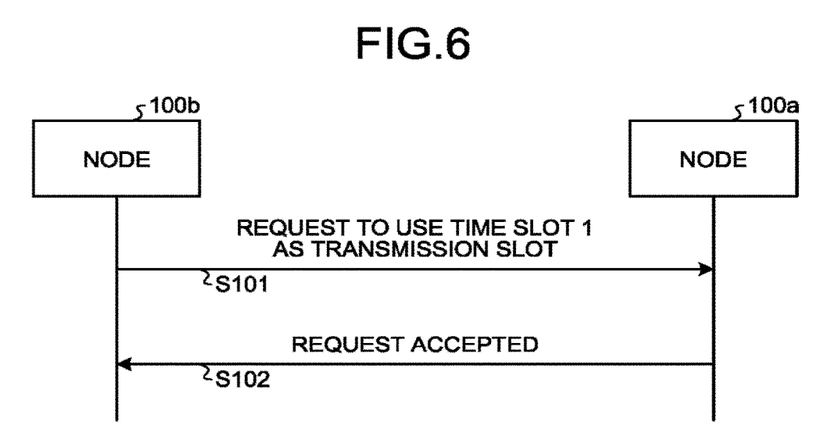
FIG. 6 is a sequence diagram illustrating an example of arranging a schedule between nodes.
Figure 7:
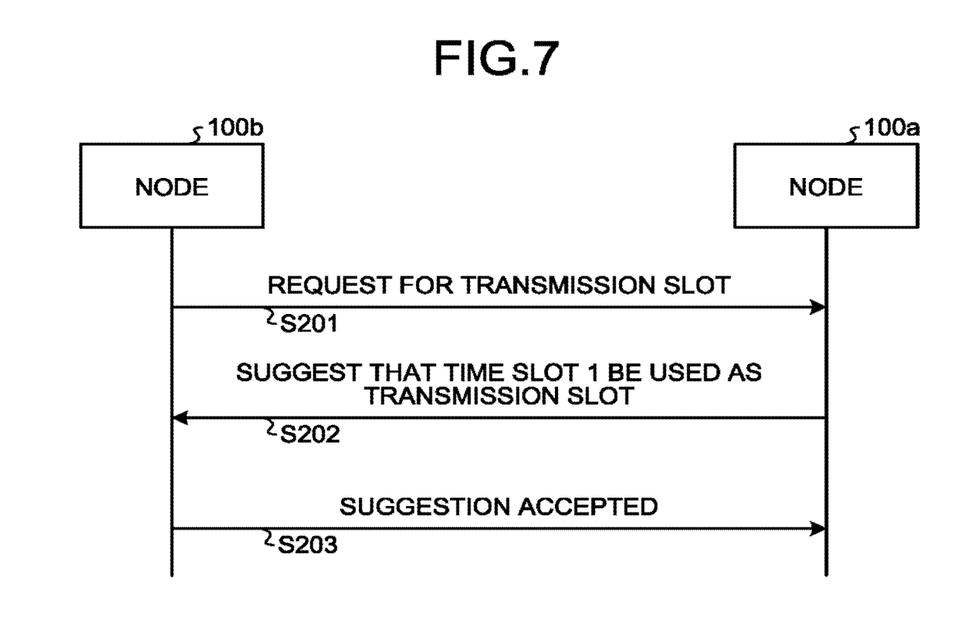
FIG. 7 is a sequence diagram illustrating an example of arranging a schedule between nodes.

When scheduling is not manually performed on the node 100a and the node 100b, the schedule between the nodes 100 is arranged using a control protocol such as 6top Protocol (6P). FIG. 6 and FIG. 7 are sequence diagrams each illustrating an example of arranging a schedule between the node 100a and the node 100b. FIG. 6 is an example in which the node 100b requests for a transmission-only slot by specifying a time slot.

First, the node 100b transmits a message requesting the node 100a to use the time slot 1 as a transmission slot dedicated to the node 100b (step S101). The node 100a sends a message to the node 100b indicating that the request has been accepted (step S102). As a result of such a process as described above, the node 100a and the node 100b share the schedule as illustrated in FIG. 5.

FIG. 7 is an example when a request is sent from the node 100b to the node 100a without specifying which time slot is to be used as the transmission slot dedicated to the node 100b. In this example, the node 100b transmits a request message to the node 100a without specifying which time slot is to be used as the transmission slot dedicated to the node 100b (step S201). For example, the node 100a transmits a message suggesting the node 100b that the time slot 1 be used as the transmission slot dedicated to the node 100b (step S202). The node 100b then transmits a message indicating that the suggestion has been accepted (step S203). Consequently, the node 100a and the node 100b can share the schedule illustrated in FIG. 5.

Although detailed description will be omitted, the node 100a and the node 100b can also share the schedule illustrated in FIG. 5, when the node 100a requests the node 100b of a reception slot dedicated to the node 100a.

Next, a situation where an additional scheduling is performed and the node 100a is made to perform an application processing at the timing of the time slot 1 will be described.

As illustrated in FIG. 5, the time slot 1 is specified as the transmission slot dedicated to the node 100b. Thus, the node 100a has to wait for data reception in the time slot 1. When the node 100a cannot wait for data reception and perform an application processing at the same time, there is a possibility that a desired operation cannot be performed, due to a failure in data reception in the time slot 1, or failure of the application processing.

When the schedule of communication processing and the schedule of application processing conflict with each other, the arrangement unit 115 arranges the schedules so that one of the communication processing and the application processing is to be executed. For example, the arrangement unit 115 arranges the schedules so that a high priority process can be preferentially executed by referring to the priority assigned to each piece of processing and the like.

For example, in the TSCH, a cell type of "hard cell" or "soft cell" can be specified. The "soft cell" indicates relatively low priority, and is a cell (unit of processing) capable of moving within a slot frame. For example, the cell type may be used to indicate the priority.

For example, when the priority of the application processing is lower than that of the data communication processing with the node 100b, the arrangement unit 115 of the node 100a shifts the execution timing of the application processing so that the data reception processing of the time slot 1 and the application processing will not conflict with each other.

For example, when the priority of the application processing is higher than that of the data communication processing with the node 100b, the arrangement unit 115 of the node 100a requests the node 100b to move (reassign) the transmission slot dedicated to the node 100b.

Figure 8:
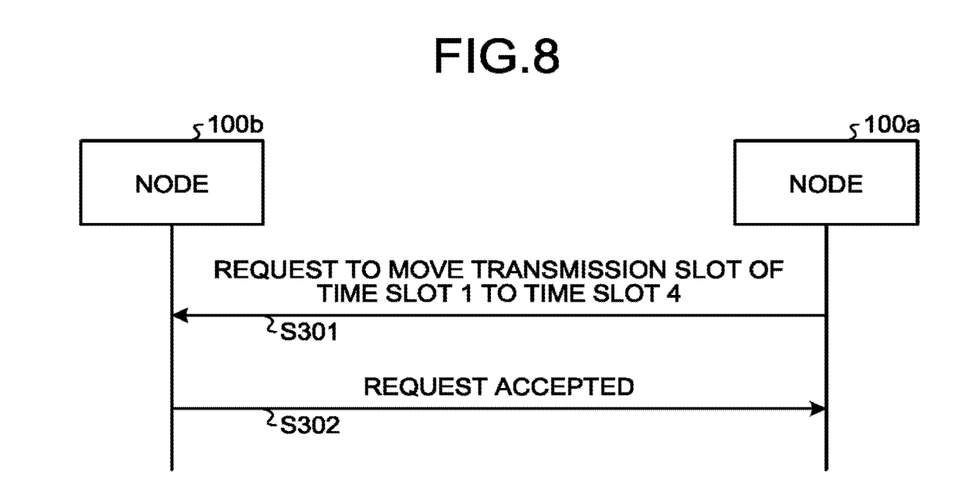
FIG. 8 is a sequence diagram illustrating an example of reassigning the schedule.
Figure 9:
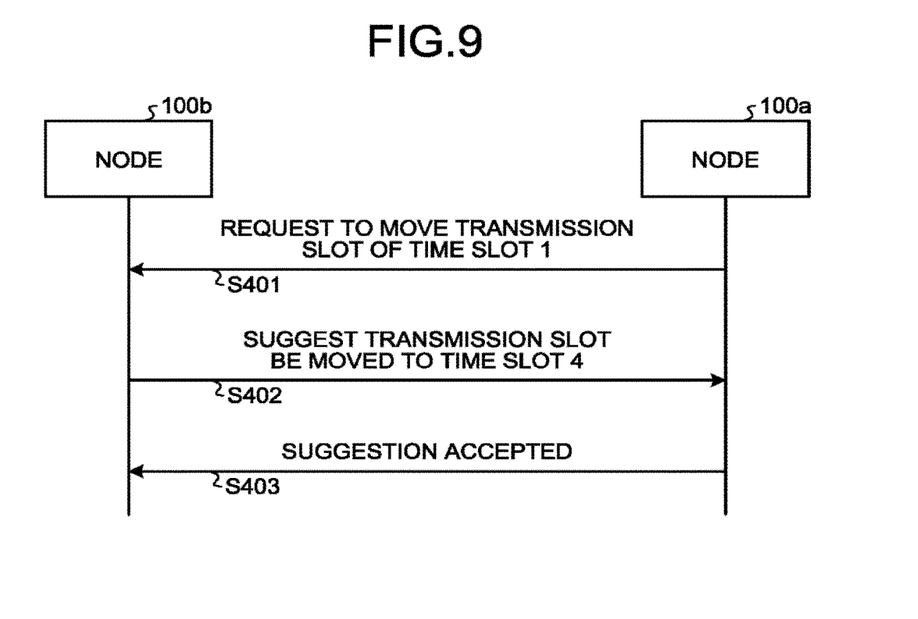
FIG. 9 is a sequence diagram illustrating an example of reassigning the schedule.

FIG. 8 and FIG. 9 are sequence diagrams each illustrating an example of reassigning the schedule of communication processing. FIG. 8 is an example of a situation where the node 100a requests a move by specifying a movement destination time slot. For example, the arrangement unit 115 of the node 100a requests the node 100b to move the transmission slot assigned to the time slot 1, to a time slot 4 (step S301). The node 100b sends a message to the node 100a indicating that the request has been accepted (step S302).

Figure 10:
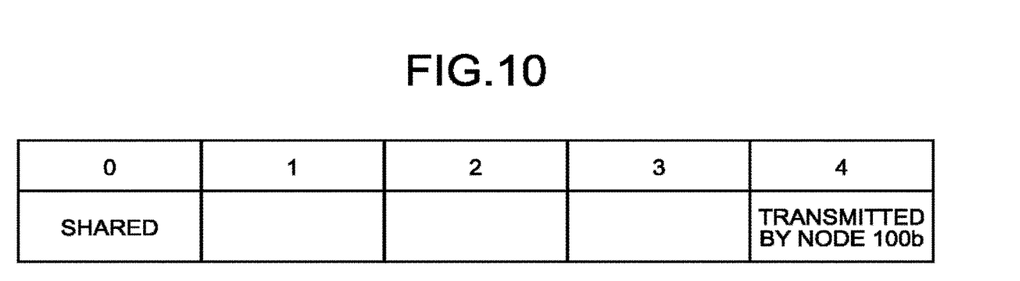
FIG. 10 is a diagram illustrating an example of a schedule.

FIG. 9 is an example of a situation where the node 100a requests a move without specifying a movement destination time slot. As illustrated in FIG. 9, the arrangement unit 115 of the node 100a requests the node 100b to move the transmission slot assigned to the time slot 1, without specifying a movement destination time slot (step S401). For example, the node 100b transmits a message suggesting that the transmission slot dedicated to the node 100b be moved to the time slot 4 (step S402). The node 100a transmits a message indicating that the suggestion has been accepted (step S403). As a result of the process as described above, the node 100a and the node 100b can share the schedule as illustrated in FIG. 10.

Figure 11:
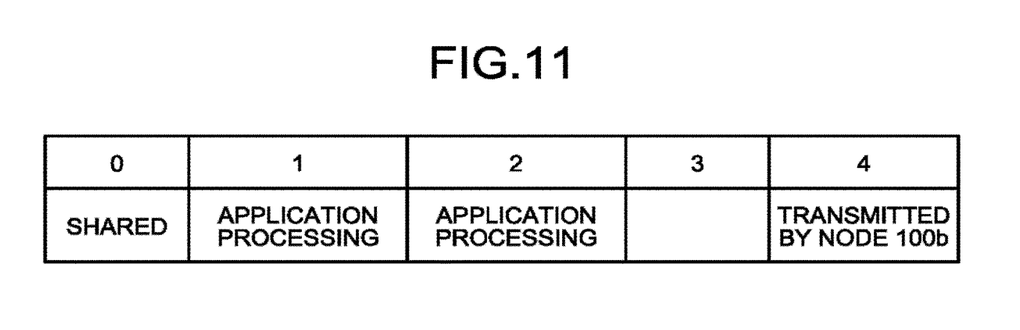
FIG. 11 is a diagram illustrating an example of assigning an application processing.

The arrangement unit 115 of the node 100a assigns an application processing having priority to the time slot 1, after moving the schedule of communication processing as described above. The arrangement unit 115 may also assign an application processing to two or more time slots according to the execution time of the application processing. FIG. 11 is a diagram illustrating an example of assigning the application processing to two time slots.

Figure 12:
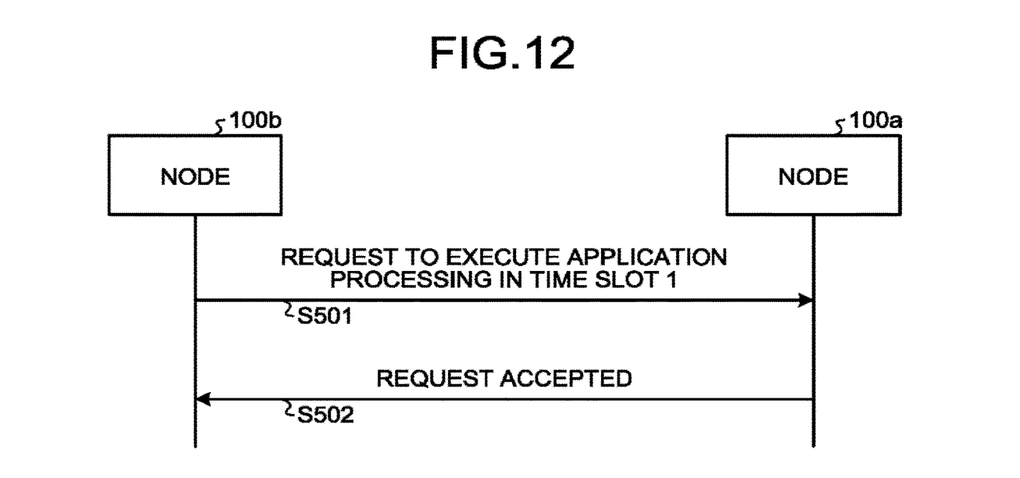
FIG. 12 is a sequence diagram illustrating an example of arranging the schedule of an application processing.
Figure 13:
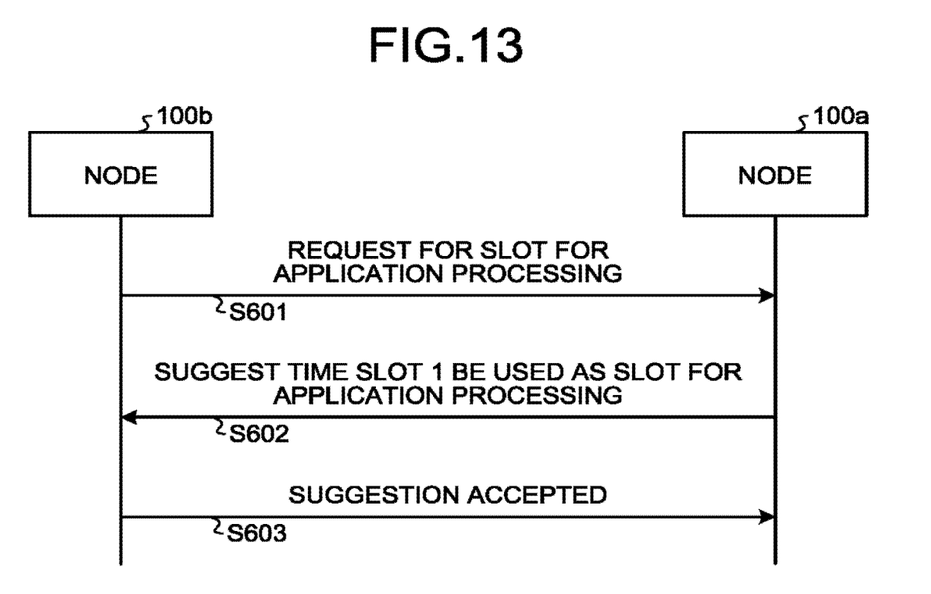
FIG. 13 is a sequence diagram illustrating an example of arranging the schedule of an application processing.

When the priority of the application processing and the priority of the data communication processing with the node 100b are the same, the arrangement unit 115 resolves conflict through the following methods, for example.
Give priority to processing scheduled first
Give priority to a schedule specified later
Determine at random The schedule of the application processing to be executed by the application processing unit 112 of the node 100a may be instructed externally from the node 100b and the like. FIG. 12 and FIG. 13 are sequence diagrams each illustrating an example of arranging the schedule of an application processing between the node 100a and the node 100b.

FIG. 12 is an example in which the node 100b requests to execute an application processing with a time slot specified. For example, the arrangement unit 115 of the node 100b transmits a message to the node 100a requesting to execute an application processing in the time slot 1 (step S501). The arrangement unit 115 of the node 100a then sends a message to the node 100b indicating that the request has been accepted (S502).

FIG. 13 is an example in which the node 100b requests to execute an application processing without specifying a time slot. For example, the arrangement unit 115 of the node 100b transmits a message to the node 100a requesting to execute an application processing without specifying a time slot (step S601). For example, the arrangement unit 115 of the node 100a sends a message to the node 100b suggesting that the time slot 1 be used as the time slot for the application processing (step S602). The node 100b transmits a message indicating that the suggestion has been accepted (step S603).

The message to be transmitted and received in FIG. 12 and FIG. 13 may be implemented by expanding a message compliant to a protocol (such as 6top Protocol) used for scheduling communication process, or may be implemented by using other protocols.

Figure 14:
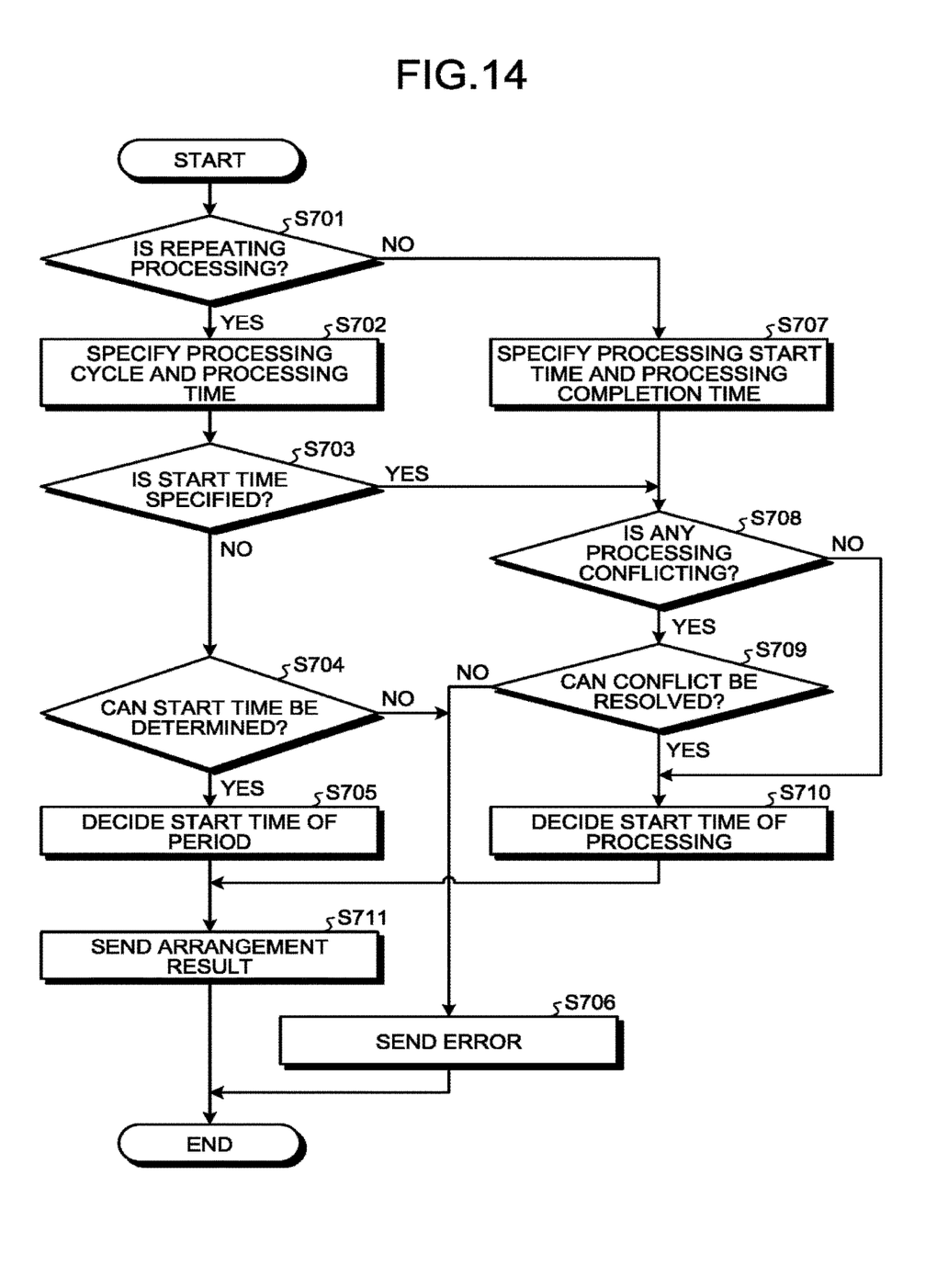
FIG. 14 is a flowchart of a schedule arrangement process in the first embodiment.

Next, a schedule arrangement process performed by the node 100 according to the first embodiment configured in this manner will be described with reference to FIG. 14. FIG. 14 is a flowchart illustrating an example of a schedule arrangement process in the first embodiment.

For example, the schedule arrangement process is started when the arrangement unit 115 receives a request for arranging the schedule of communication processing from the communication schedule control unit 113, and when the arrangement unit 115 receives a request for arranging the schedule of an application processing from the processing control unit 114.

In the TSCH, in general, the schedule of communication processing is specified such that the schedule is executed periodically (repeatedly). Similarly, the application processing may be specified such that the schedule is executed periodically. The communication process and the application process may also be specified such that the schedule is executed singly without being executed periodically.

First, the arrangement unit 115 determines whether the processing the schedule of which is to be arranged is repeating processing (step S701). For example, the arrangement unit 115 determines whether the requested processing is repeating processing, from information added to the request, a type of requested processing, or the like.

For example, when the processing is the repeating processing (Yes at step S701), the arrangement unit 115 specifies the processing cycle and processing time of the requested processing, from information added to the request, and the like (step S702). Next, the arrangement unit 115 determines whether the start time of the requested processing is specified (step S703). For example, in a case where the time slot to execute the requested processing is specified, or the like, the arrangement unit 115 determines that the start time is specified.

When the start time is not specified (No at step S703), the arrangement unit 115 determines whether the start time can be determined (step S704). For example, the arrangement unit 115 determines whether a time slot to start the requested processing can be determined, by referring to the processing time of the requested processing, an empty time slot, and the like. The arrangement unit 115 may also arrange and move the time slot of the communication processing that is already determined with the other node 100 and the like. When the other processing having high priority is scheduled or the like, the arrangement unit 115 determines that the start time of the requested processing cannot be determined (time slot cannot be arranged).

When the start time can be determined (Yes at step S704), the arrangement unit 115 decides the start time of a requested processing (periodical processing) (step S705). When the start time cannot be determined (No at step S704), the arrangement unit 115 sends an error indicating that the schedule cannot be arranged, to the communication schedule control unit 113 or the processing control unit 114 that is a requestor (step S706).

For example, when it is determined that the requested processing is not repeated processing at step S701 (No at step S701), the arrangement unit 115 specifies the processing start time and the processing completion time of the requested processing, from the information added to the request, and the like (step S707).

After step S707 and when it is determined that the processing start time requested at step S703 is specified (Yes at step S703), the arrangement unit 115 determines whether there is any processing conflicting with the requested processing, by referring to the specified processing start time and processing completion time, or the specified start time, processing time, or the like (step S708).

When there is conflicting processing (Yes at step S708), the arrangement unit 115 determines whether the conflict can be resolved (step S709). For example, the arrangement unit 115 determines whether the conflict can be resolved by moving the time slot assigned to the processing having low priority. The arrangement unit 115 can also arrange and move the time slot of the communication processing determined with the other node 100 according to the needs.

When the conflict can be resolved (Yes at step S709) and when it is determined that there is no conflicting processing at step S708 (No at step S708), the arrangement unit 115 decides the start time of the requested processing (step S710). When the start time of the processing is decided (step S705 and step S710), the arrangement unit 115 sends the arrangement result of the schedule, to the communication schedule control unit 113 or the processing control unit 114 that is a requestor (step S711).

When the conflict cannot be resolved (No at step S709), the arrangement unit 115 sends an error indicating that the schedule cannot be arranged, to the communication schedule control unit 113 or the processing control unit 114 (step S706). The arrangement unit 115 may also send an error to a function unit that is not a requestor having requested to arrange the schedule (for example, when the communication schedule control unit 113 is a requestor, the processing control unit 114).

When the error is sent (step S706) and the arrangement result is sent (step S711), the schedule arrangement process will be finished.

The communication schedule control unit 113 or the processing control unit 114 that has received the error may request the arrangement unit 115 to rearrange the schedule of the processing according to the needs. The arrangement unit 115 executes the process from step S701 again, upon receiving the next request for arranging the schedule.

First Modification

When the processing time of the application processing is sufficiently short, the arrangement unit 115 can schedule the data communication processing and the application processing within the same time slot.

Figure 15:
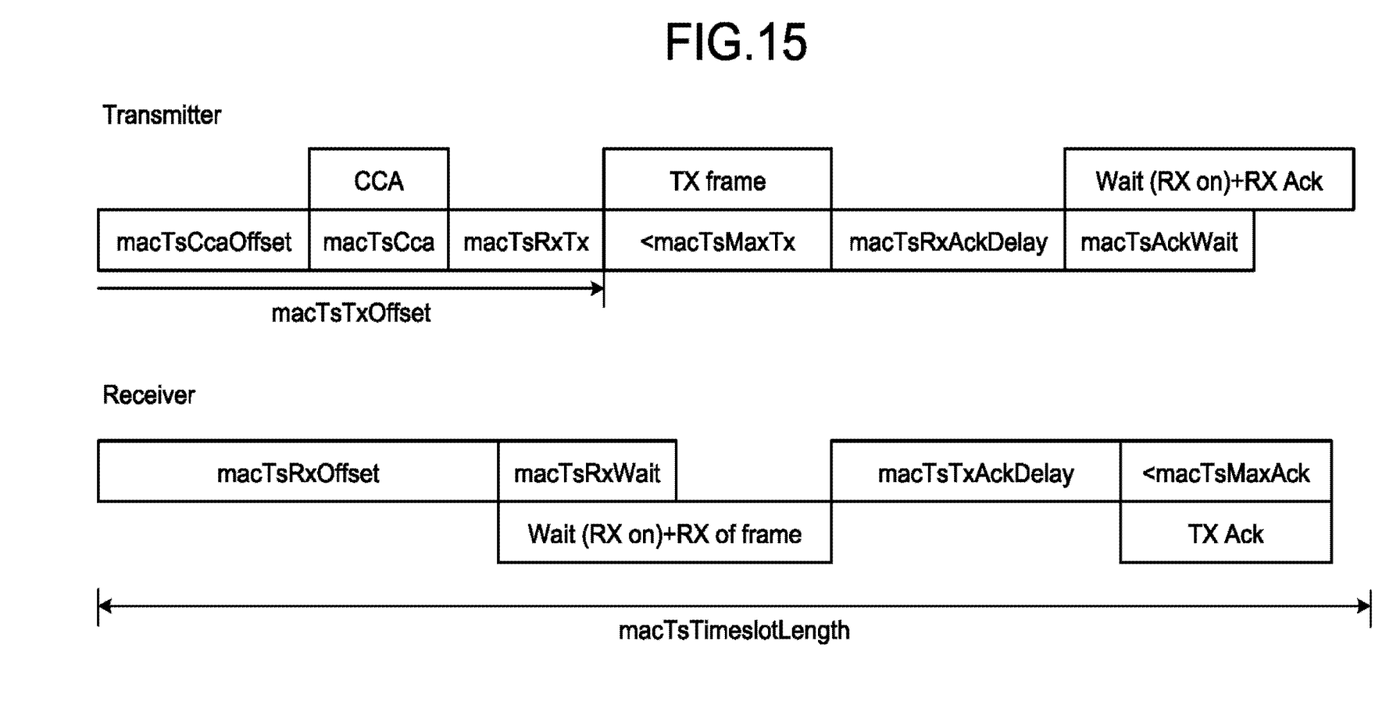
FIG. 15 is a diagram illustrating timings at which data is transmitted and received in a time slot.

FIG. 15 is a diagram illustrating timings of the transmission processing and the reception processing of data within a single time slot specified in IEEE 802.15.4-2015. The transmission processing and the reception processing in the single time slot are configured by sub-processing respectively indicated by "Transmitter" and "Receiver" in FIG. 15.

For example, data is transmitted in a section of "TX frame" in FIG. 15. Depending on the hardware configuration and software configuration of the node 100, a CPU is not necessarily required in the transmission processing and the reception processing of a wireless signal, and an application processing may be executed in the period of "TX frame". Moreover, data is received in the period of "RX of frame", but an application processing may also be executed during this period. Furthermore, a waiting processing for matching the timing of transmission and reception and the like may be performed in the other section. An application processing can also be performed in the period of the waiting processing as described as above.

Still furthermore, for example, when a circuit (such as a wireless communication chip) for implementing the function of executing a communication processing (such as the communication unit 101 and the communication control unit 111) is separated from a circuit (such as CPU) for implementing the function of executing the other processing (such as the application processing unit 112 and processing control unit 114), the CPU can sometimes execute the other processing after the CPU instructs the wireless communication chip to start a communication processing. In other words, a communication processing performed by the wireless communication chip and an application processing performed by the CPU may be executed simultaneously.

In this manner, depending on the configuration of the node 100 (such as resource) and the processing time required for the application processing, the application processing may be executed in the same time slot as that of the data communication processing. Thus, the arrangement unit 115 may determine that the data communication processing and the application processing may be performed in the single time slot, on the basis of resource available in the node 100, and the like.

In this manner, with the communication device according to the first embodiment, it is possible to resolve the conflict between the communication processing of time division multiplexing and the application processing.

Second Embodiment

In the second embodiment, a communication device (such as a central server and a parent node) other than the node that executes a communication processing performs scheduling on the processing of the node.

Figure 16:
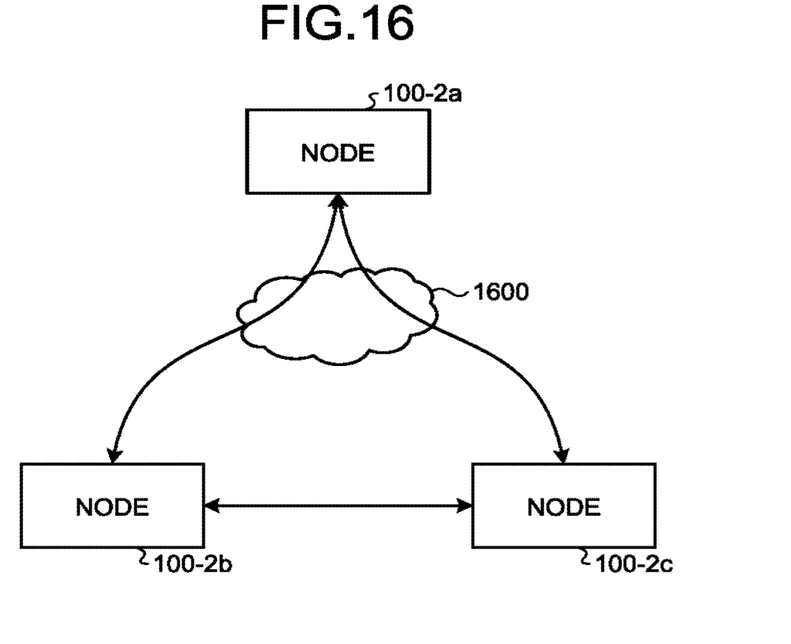
FIG. 16 is a block diagram of a communication system according to a second embodiment.

FIG. 16 is a block diagram illustrating an example of a configuration of a communication system according to a second embodiment. As illustrated in FIG. 16, the communication system of the second embodiment includes nodes 100-2a, 100-2b, and 100-2c as communication devices. Because the nodes 100-2a, 100-2b, and 100-2c have the similar configuration, the nodes 100-2a, 100-2b, and 100-2c are simply referred to as nodes 100-2, when the nodes 100-2a, 100-2b, and 100-2c need not be distinguished from one another. The number of the nodes 100-2 is not limited to three, and may be four or more. A plurality of the nodes 100-2 are connected via a network 1600. For example, the network 1600 is a wireless network such as IEEE 802.15.4. However, the network 1600 may be any type of network such as a wired network.

Figure 17:
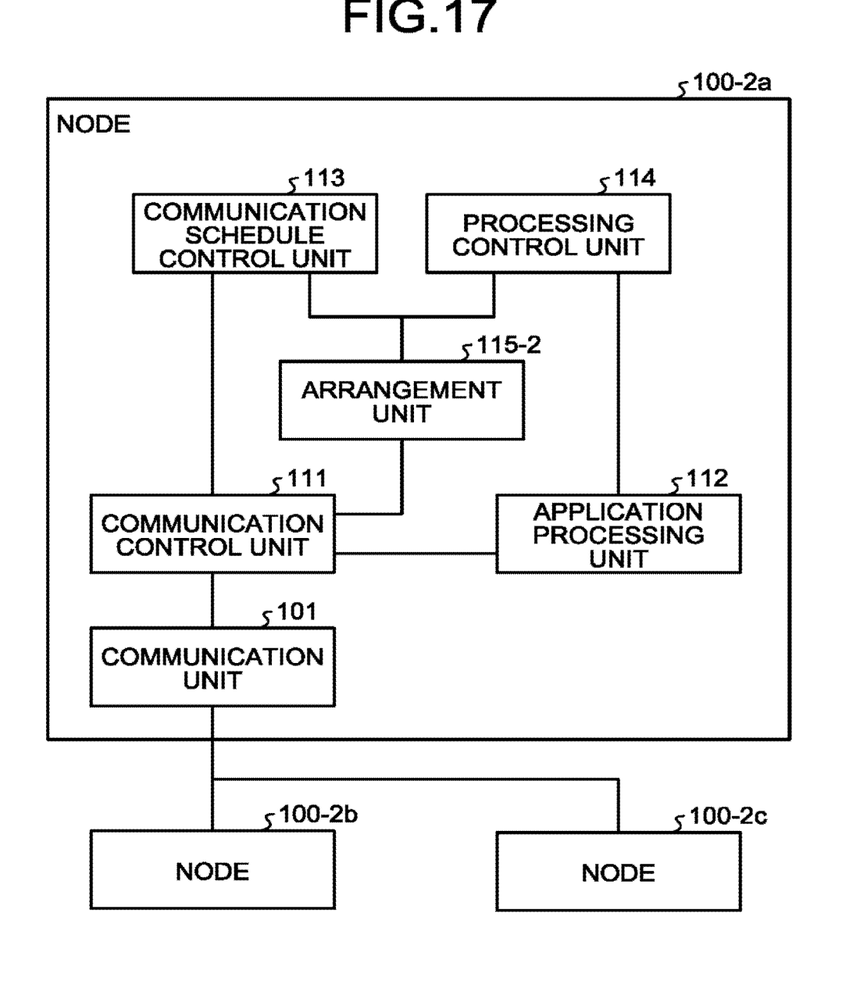
FIG. 17 is a block diagram of a node according to the second embodiment.

FIG. 17 is a block diagram illustrating an example of a configuration of the node 100-2 according to the second embodiment. As illustrated in FIG. 17, the node 100-2 includes the communication unit 101, the communication control unit 111, the application processing unit 112, the communication schedule control unit 113, the processing control unit 114, and an arrangement unit 115-2.

In the second embodiment, the function of the arrangement unit 115-2 is different from that of the arrangement unit 115 in the first embodiment. The other structures and functions in the second embodiment are the same as those in the block diagram of the node 100 according to the first embodiment in FIG. 2. Consequently, the same reference numerals denote the same components and a description thereof will be omitted.

The arrangement unit 115-2 is different from the arrangement unit 115 in the first embodiment in arranging the schedule of the application processing to be executed by the other node 100-2, in addition to the schedule of the communication processing to be executed by the other node 100-2.

For example, the arrangement unit 115-2 of the node 100-2a determines the schedule by requesting and suggesting to the node 100-2b and the node 100-2c, which node 100-2 is to transmit (receive) data in which time slot. Moreover, the arrangement unit 115-2 of the node 100-2a determines the schedule by requesting and suggesting to the node 100-2b and node 100-2c, an application processing and the execution timing (time slot).

The overall flow of the schedule arrangement process in the second embodiment is the same as the schedule arrangement process in the first embodiment illustrated in FIG. 14. Consequently, description thereof will be omitted.

In the following, an example of when the node 100-2a arranges the schedule of processing to be executed by the node 100-2b and the node 100-2c will be described. Because the nodes 100-2 have the same configuration, any node 100-2 may be mainly used to arrange the schedule of the processing to be performed by the other node 100-2.

For example, the arrangement unit 115-2 of the node 100-2a schedules an execution of at least one piece of the processing (communication processing or application processing) of the node 100-2b and the node 100-2c at any timing. For example, the arrangement unit 115-2 manages the schedule as illustrated in FIG. 4 and the like, of the processing to be executed by the other node 100-2. The arrangement unit 115-2 then arranges the schedule of the processing to be executed by the other node 100-2, according to the schedule arrangement process illustrated in FIG. 14. The arrangement unit 115-2 of the present embodiment notifies the node 100-2 that executes the processing of the arrangement result.

The arrangement unit 115-2 of the node 100-2 that has received the notification controls the communication schedule control unit 113 or the processing control unit 114 so as to execute the communication processing or the application processing according to the notified arrangement result.

The application processing to be executed by the other node 100-2 includes the following examples. For example, it is assumed that the communication system is a smart meter system. In this case, the head end system or the meter data management system corresponds to the node 100-2a, and smart meters correspond to the node 100-2b and the node 100-2c.

For example, the smart meter has an application processing function (application processing unit 112) that measures the electric power amount. The head end system has an application processing function (application processing unit 112) that manages and controls the measurement timing of the electric power amount of each of the smart meters. For example, the application processing function may determine the measurement timing of the electric power amount of each of the smart meters, and request the arrangement unit 115-2 to arrange the schedule. The arrangement unit 115-2 may also arrange the schedule according to the request and notifies the smart meter of the arrangement result.

The measurement timing determined by the smart meter itself may also be sent to the application processing function of the head end via the arrangement unit 115-2 of the smart meter.

In this manner, with the communication device according to the second embodiment, it is possible to execute scheduling of the processing including processing of the other node.

As described above, according to the first and second embodiments, the schedules of the communication processing with time division multiplexing and the application processing can be integrally arranged.

Figure 18:
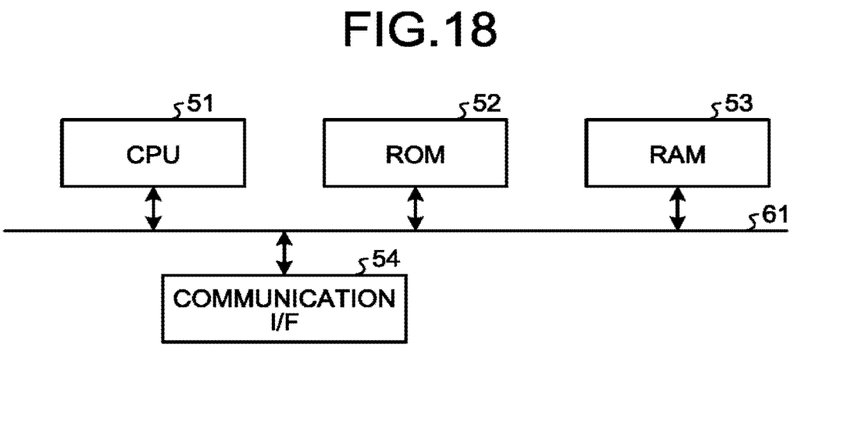
FIG. 18 is a hardware configuration diagram of a communication device according to the first embodiment or the second embodiment.

Next, a hardware configuration of the communication device according to the first or second embodiment will be described with reference to FIG. 18. FIG. 18 is an explanatory diagram illustrating a hardware configuration example of the communication device according to the first or second embodiment.

The communication device according to the first or second embodiment includes a control device such as a central processing unit (CPU) 51, a storage device such as a read only memory (ROM) 52 and a random access memory (RAM) 53, a communication interface (I/F) 54 that performs communication by connecting to a network, and a bus 61 that connects the units.

A computer program to be executed by the communication device according to the first or second embodiment is incorporated into the ROM 52 and the like in advance.

The computer program to be executed by the communication device according to the first or second embodiment may also be provided as a computer program product by being recorded in a computer readable recording medium such as a compact disc-read only memory (CD-ROM), a flexible disk (FD), a compact disc-recordable (CD-R), and a digital versatile disc (DVD) as a file of an installable format or an executable format.

The computer program to be executed by the communication device according to the first or second embodiment may also be provided by storing the computer program on a computer connected to a network such as the Internet, and by being downloaded via the network. Moreover, the computer program to be executed by the communication device according to the first or second embodiment may be provided or distributed via a network such as the Internet.

The computer program to be executed by the communication device according to the first or second embodiment may cause a computer to function as units in the communication device described above. The CPU 51 of the computer can read the computer program from a computer readable storage medium onto the main storage device to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
one or more processors configured to:
arrange a schedule of a communication processing that includes at least one of transmitting a message or receiving a message with time division multiplex communication including time slotted channel hopping and one or more schedules of one or more pieces of application processing that are different from the communication processing;
execute the communication processing according to the arranged schedule; and
control execution of an application according to the arranged schedule, wherein
the one or more pieces of application processing are executed periodically,
wherein the one or more processors arrange the schedule of the communication processing and the one or more schedules of the one or more pieces of application processing, upon receiving a request to arrange communication timing of the time division multiplex communication.

2. The device according to claim 1, wherein the one or more processors arrange the schedule of the communication processing and the one or more schedules of the one or more pieces of application processing to be executed by another device that is different from the communication device.

3. The device according to claim 1, wherein when the schedule of the communication processing and the one or more schedules of the one or more pieces of application processing conflict with each other, the one or more processors arrange the schedules so that one of the communication processing and the one or more pieces of application processing is to be executed.

4. The device according to claim 1, wherein the one or more processors arrange the schedule of the communication processing and the one or more schedules of the one or more pieces of application processing based on available resource.

5. A communication method comprising:
arranging a schedule of a communication processing that includes at least one of transmitting a message or receiving a message with time division multiplex communication including time slotted channel hopping and one or more schedules of one or more pieces of application processing that are different from the communication processing;
executing the communication processing according to the arranged schedule; and
controlling execution of an application according to the arranged schedule, wherein
the one or more pieces of application processing are executed periodically,
wherein the schedule of the communication processing and the one or more schedules of the one or more pieces of application processing are arranged upon receiving a request to arrange communication timing of the time division multiplex communication.

6. A computer program product comprising a non-transitory computer readable medium including programmed instructions, wherein the instructions, when executed by a computer, cause the computer to execute:
arranging a schedule of a communication processing that includes at least one of transmitting a message or receiving a message with time division multiplex communication including time slotted channel hopping and one or more schedules of one or more pieces of application processing that are different from the communication processing;
executing the communication processing according to the arranged schedule; and
controlling execution of an application according to the arranged schedule, wherein the one or more pieces of application processing are executed periodically, wherein the schedule of the communication processing and the one or more schedules of the one or more pieces of application processing are arranged upon receiving a request to arrange communication timing of the time division multiplex communication.

7. The device according to claim 1, wherein
the one or more pieces of application processing include a network processing higher than the communication processing.

8. The device according to claim 1, wherein
the one or more pieces of application processing include a processing not involving communication.

* * * * *